Patented Feb. 27, 1940

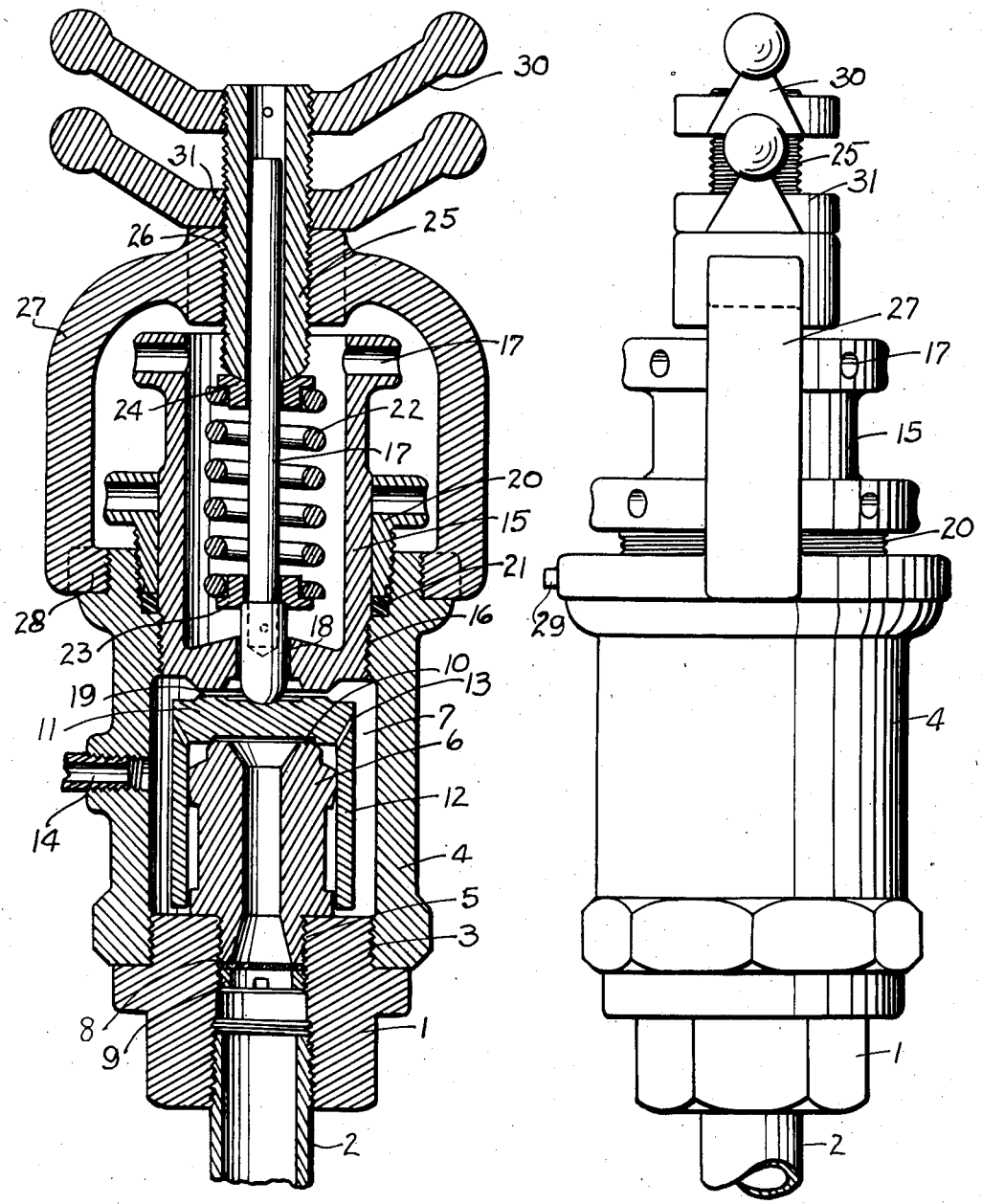

2,191,726

UNITED STATES PATENT OFFICE 2,191,726

PRESSURE CONTROL VALVE

Theodore R. Peters and Ollie L. Mulloy, Shreveport, La., assignors to Alva G. Blanchard, Shreveport, La.

Application October 9, 1937, Serial No. 168,157

6 Claims. (Cl. 251—118)

The invention relates to pressure control valves for regulating the amount of pressure fluid which may pass through a line to control the operation of the valves or other similar devices.

Such valves are employed, for example, upon the steam line of a boiler, and serve to regulate the passage of steam which actuates valves in the fuel line leading to the boiler, whereby an excess of steam pressure in the boiler may tend to regulate the fuel valves and thus reduce the steam pressure in the boiler through control of the delivery of fuel to the furnace.

This invention is an improvement upon a similar device disclosed in prior patent No. 1,972,757, granted September 4, 1934.

It is an object of the present invention to provide a valve of the character described in the previous patent above identified, wherein the pressure tending to hold the steam delivery valve in closed position may remain constant while the stop member regulating the extent of movement of the valve from its seat may be independently adjusted.

It is desired to provide a valve of the character stated whereby the extent of movement of the valve may be controlled while the pressure holding the valve on its seat remains constant.

It is a further object of the invention to mount the device for holding the valve upon its seat independently of the stop member which regulates the extent of movement.

Referring to the drawing herewith:

Fig. 1 is a central longitudinal section through a valve embodying the invention.

Fig. 2 is a side elevation thereof taken at right angles to the view shown in Fig. 1.

In the drawing there is shown a valve base 1, which is of tubular form having a lower opening threaded to receive the steam conducting line 2. The upper end of the base member is threaded at 3 for connection with the tubular valve body 4. At the upper end of the passage through the base member 1 said passage is threaded at 5 for connection with the valve nipple 6. Said nipple has a reduced lower end screwed within the threaded opening 5 and extends upwardly into the valve chamber 7 within the valve body 4.

Below the valve nipple 6 within the passage through the base there is preferably a wall 8 or screen of foraminated material to prevent the entrance into the valve of foreign matter. This screen is held in position within the lower end of this nipple 6 by the tubular nut 9.

At the upper end of the valve nipple 6 there is a valve seat 10, said seat being annular in shape and having a plane upper surface to contact with the valve plate 11.

Said plate 11 is formed on its lower side to engage with the valve seat 10 and form a seal therewith. There is an outer downwardly extending skirt 12 on the plate which engages against the outer surface of the valve nipple 6. This skirt serves as a guide for the valve in moving to and from its seat and assures the proper positioning of the valve. There are a plurality of upwardly inclined openings 13 in said skirt adjacent the valve plate which allows the passage of pressure fluid such as steam upwardly into the valve chamber 7.

Fluid passing through the valve nipple and past the valve into the valve chamber 7 will find a lateral outlet through the pipe 14 extending through the wall of the chamber. Steam thus passing through the chamber may be conducted to a valve control device or other operated apparatus.

The upper end of the valve chamber 7 is closed by a stop sleeve 15. Said sleeve is screwed at 16 within the upper end of the valve body and extends upwardly above the body, having openings 17 at its upper end to receive a wrench or pin whereby the sleeve may be rotated to adjust said sleeve within said opening 16 to position the said sleeve relative to the valve. The lower end of the sleeve within the chamber is closed except for an opening 18 therein to receive a valve stem 17. On the lower surface of the sleeve at the upper end of the chamber is an annular ridge 19, which is positioned opposite the upper end of the valve plate to act as a stop member to limit the upward movement of the valve 11 from its seat. The valve plate when raised against the stop plate 15 forms a seal with the ridge 19, thus closing off the escape of fluid around the valve stem or presser rod 18. The upper seat is hence a valve seat also, larger in circumference than is the valve seat 10.

There is a gland 20 around the sleeve within the upper end of the valve body which may compress packing 21 and thus form a seal around the stop sleeve.

The stem 17 previously referred to extends through the lower end of the stop sleeve and bears against the upper side of the valve. It is held resiliently against the valve by means of a spring 22, which bears against a washer or plate 23 on the lower end of the stem and at its upper end it bears against a similar ring or washer 24, which is in turn held upon the valve stem by adjusting screw 25.

The adjusting screw 25 is threaded at 26 within an opening through the upper end of a yoke 27. Said yoke is formed with a threaded ring or nut 28 at its lower end so as to be screwed upon the upper end of the valve body. This ring may be secured in a fixed position after being screwed in place by means of a set screw 29, shown in Fig. 2. The adjusting screw 25 may be adjusted vertically within the upper end of the yoke 27 by means of handles 30. Said screw has a longitudinal opening therethrough, through which the stem 17 is formed to project. The lower end of the screw is rounded somewhat and bears against the ring 24, and on rotation of the screw the pressure upon the spring 22 may be controlled.

It will be understood that when the tension necessary to properly control the valve is once set it is not desirable to again change this tension. A lock nut 31 is provided to prevent accidental rotation of the adjusting screw 25 in the yoke.

It is desirable from time to time to vary the amount of pressure fluid which may pass the valve. This may be regulated by the adjusting of the stop sleeve relative to the valve 11, and it will be noted that this adjustment may be made without in any way affecting the resilient pressure upon the valve which holds it upon its seat.

If it becomes desirable to limit or increase the amount of pressure fluid passing through the valve, this may be done by adjusting the stop sleeve relative to the valve, and it will be understood that this will in no way affect the pressure which it is necessary for the fluid to exert to move the valve away from its seat to allow said fluid to pass. This result is obtained by the constant pressure of the stem 17 against the valve exerted by the spring 22. It is not necessary to change this adjustment whenever it becomes desirable to increase the volume of flow for the reason that the adjusting screw is independent of any connection with the stop sleeve.

It will be obvious that the present structure has advantages over the structure shown in the prior patent due to the fact that the adjustment which is necessary to hold the stem 17 against the valve with the proper pressure desired in the use of the device may be made independently. This result is accomplished by the separate mounting of the stop sleeve and the adjusting screw so that one may be manipulated without any relation whatever to the adjustment of the other. The advantages of this construction will be obvious to those skilled in the art.

What is claimed as new is:

1. In a pressure control valve, a casing having a valve chamber, a valve seat therein, a valve head on said seat, and an adjustable stop sleeve closing said chamber above said valve head, said stop sleeve having a seating area for said valve of larger diameter than said seat and serving to limit the extent of movement of said valve head from its seat, a yoke on said valve casing extending above said sleeve and spaced therefrom, a stem bearing loosely on said valve head, a spring on said stem to urge it resiliently through said sleeve against said valve head, and a screw adjustable in said yoke to control the pressure of said spring on said valve head independently of the position of said sleeve.

2. In a pressure control valve, a casing having a valve chamber, a nipple therein, a valve seat on said nipple, a valve plate on said seat, a yoke on said casing, an adjustable bushing on said yoke above said valve plate, a stem slidable through said bushing and bearing upon said plate, a spring adjustable by said bushing and tending to hold said stem and plate toward said seat with a predetermined force, an adjustable stop sleeve closing the upper end of said chamber, a stop seat on said sleeve of larger diameter than said valve seat, said stop sleeve being adjustable independently of said yoke to vary the movement of said valve plate and thereby the tension of the spring while the plate is seated on the stop seat.

3. In a pressure control valve, a casing having a valve chamber, a nipple therein, a valve seat on said nipple, a valve plate on said seat, a yoke on said casing, an adjustable bushing on said yoke above said valve plate, a stem slidable thru said bushing and bearing upon said plate, a spring adjustable by said bushing and tending to hold said stem and plate toward said seat with a predetermined force, a stop member adjustable in the upper end of said chamber and having a central opening below said spring to receive said stem and a stop seat on the lower side of said member to be engaged by said valve plate when in open position.

4. In a pressure control valve, a housing, a stationary seat therein, a movable seat opposite said stationary seat, a movable valve plate between said seats, a stem, a spring thereon mounted independently of said movable seat for yieldingly urging said movable valve plate toward said stationary seat through said movable seat, means of adjusting the position of said movable seat without disturbing adjustment of said spring.

5. In a pressure control valve, a housing, a stationary seat therein, an adjustable seat opposite said stationary seat, a movable valve plate between said seats, a spring yieldingly urging said movable valve plate toward said stationary seat through said adjustable seat, an adjustment for varying the tension on said spring independent of the movement of the adjustable seat.

6. In a pressure control valve, a housing, a stationary seat therein, an opposing seat, a movable valve between said stationary seat and opposing seat, a spring yieldingly urging said movable valve toward said stationary seat through said opposing seat, means of adjusting said opposing seat to vary the tension of the spring while said movable valve is seated on said opposing seat, said spring being mounted independently of said opposing seat whereby the tension on said valve plate when it is upon said stationary seat is unaffected by adjustment of said opposing seat.

THEODORE R. PETERS.
OLLIE L. MULLOY.